US005897120A

United States Patent [19]
Scavo et al.

[11] Patent Number: 5,897,120
[45] Date of Patent: Apr. 27, 1999

[54] OUTER FLAP ELASTIC SEAL ASSEMBLY

[75] Inventors: Steven Scavo, Mason; Darrell G. Senile, Fairfield, both of Ohio

[73] Assignee: General Electric Company, Cincinnati, Ohio

[21] Appl. No.: 08/842,548

[22] Filed: Apr. 15, 1997

[51] Int. Cl.$^6$ ................................................ F16J 15/02
[52] U.S. Cl. ........................ 277/628; 277/634; 277/651; 239/265.35
[58] Field of Search ................................ 277/500, 628, 277/635, 634, 651, 650, 637, 640, 554, 555; 60/232; 239/265.35

[56] References Cited

U.S. PATENT DOCUMENTS

| | | | |
|---|---|---|---|
| 3,114,561 | 12/1963 | Creath et al. | 277/628 X |
| 3,554,562 | 1/1971 | Davis, Jr. | 277/555 X |
| 3,625,525 | 12/1971 | Davis, Jr. | 277/555 X |
| 3,792,815 | 2/1974 | Swavely et al. | |
| 4,022,948 | 5/1977 | Smith et al. | |
| 4,114,248 | 9/1978 | Smith et al. | |
| 4,128,208 | 12/1978 | Ryan et al. | |
| 4,132,068 | 1/1979 | Johnston | 60/232 X |
| 4,645,217 | 2/1987 | Honeycutt, Jr. et al. | |
| 4,994,660 | 2/1991 | Hauer . | |
| 5,082,182 | 1/1992 | Bruchez, Jr. et al. | 239/265.35 |
| 5,150,839 | 9/1992 | Reedy | 239/265.35 X |
| 5,285,637 | 2/1994 | Barcza | 60/232 X |
| 5,351,888 | 10/1994 | Taylor et al. | 60/232 X |
| 5,398,499 | 3/1995 | Urruela | 239/265.35 |
| 5,484,105 | 1/1996 | Ausdenmoore et al. | |
| 5,485,959 | 1/1996 | Wood et al. | |
| 5,613,636 | 3/1997 | Zubillaga et al. | 239/265.35 |

*Primary Examiner*—Anthony Knight
*Assistant Examiner*—John R. Cottingham
*Attorney, Agent, or Firm*—Andrew C. Hess; David L. Narciso

[57] ABSTRACT

An elastic seal includes a longitudinally extending elastomeric seal member with a continuous sealing surface and a longitudinally extending structural support member having at least one section with fingers extending transversely from the section with slots between the fingers. Each of the fingers is entirely embedded within the elastomeric seal member near the continuous elastomeric sealing surface. The fingers are preferably articulated downward in a direction normal to the sealing surface and together with the rest of the support member are preferably made of a spring material such as a flexible material such as a springy sheet metal. The elastomeric seal and structural members may be continuous bands with continuous metallic band with the fingers extending transversely from the metallic band. The continuous metallic and elastomeric bands may be annular, rectangular, ellipsoid, or have some other shaped cross-section.

24 Claims, 7 Drawing Sheets

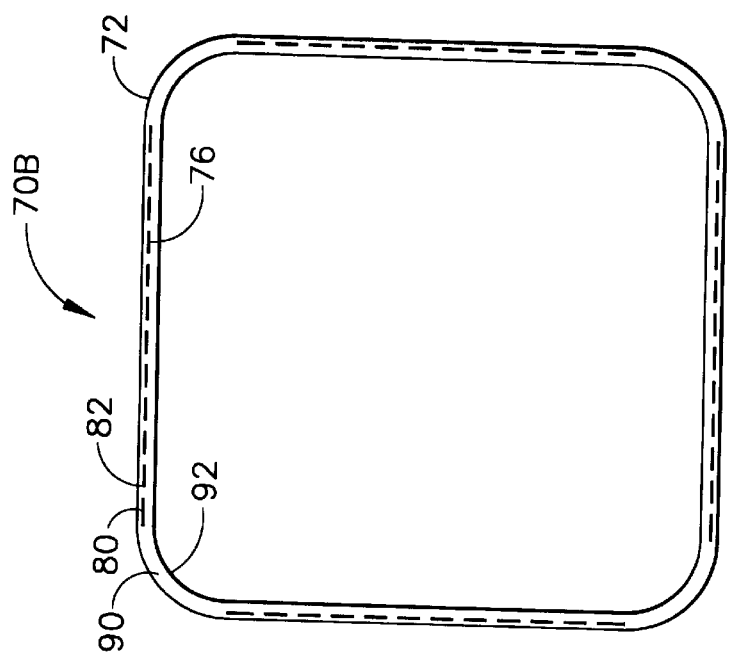
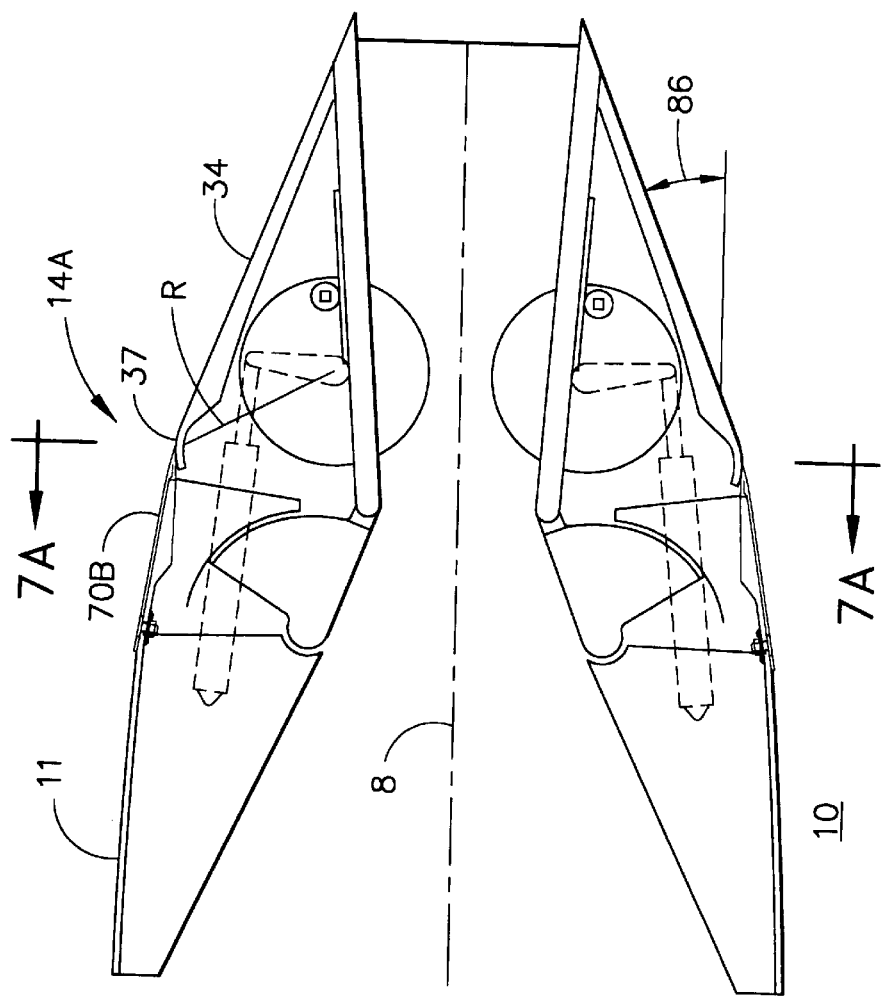
FIG. 7A
FIG. 7

OUTER FLAP ELASTIC SEAL ASSEMBLY

The Government has rights in this invention pursuant to Air Force Contract No. F33615-91C-2119.

BACKGROUND OF THE INVENTION

1. Field of the Invention

This invention relates generally to sealing devices for providing a close seal between a stationary member and a member pivotal in relation thereto and, more particularly, with respect to aircraft gas turbine engines, between engine ducts and outer flaps of vectorable or non-vectorable exhaust nozzles.

2. Discussion of the Background Art

Exhaust nozzles for military aircraft gas turbine engines typically include outer flaps which define the outer wetted surface of exhaust nozzle and is exposed to the airstream flowing past the aircraft. The outer flaps are usually hinged to an outer engine casing. Typical types of exhaust nozzles include axisymmetrical vectorable and nonvectorable and two dimensional. Vectorable nozzles generally employ divergent flaps to turn or vector the exhaust flow and thrust of the gas turbine engine powering the aircraft. Two dimensional nozzles have been devised which employ relatively flat flaps to direct the pitch or yaw direction of the engine's thrust. Hauer, in U.S. Pat. No. 4,994,660 incorporated herein by reference, discloses an Axisymmetric Vectoring Nozzle (i.e., General Electric's AVEN® nozzle) that provides a means for vectoring the thrust of an axisymmetric convergent/divergent nozzle by universally pivoting the divergent flaps of the nozzle in an asymmetric fashion or in other words pivoting the divergent flaps in radial and tangential directions with respect to the unvectored nozzle centerline. Wood et al., in U.S. Pat. No. 5,485,959 incorporated herein by reference, discloses a thermal shield for the Axisymmetric Vectoring Nozzle with outer flaps and seals.

Hot pressurized nozzle flow is contained by convergent and divergent flaps and seals (in the case of axisymmetric nozzles) wherein the divergent flaps and seals are pivotally connected to the nozzle throat in a manner permitting pivotal movement and axial translation of the exhaust nozzle exit. Outer flaps pivotally connected to an exhaust casing of the engine and outer seals (when used) supported by and disposed the outer flaps are used to surround the nozzle's convergent and divergent flaps and seals as demonstrated in U.S. Pat. No. 4,128,208 by Ryan et al., entitled "Exhaust Nozzle Flap Seal Arrangement" assigned to the same assignee as the present invention. The outer flaps and seals are convergent in shape in the aft direction and are designed to provide an aerodynamically smooth surface around the nozzle to prevent adverse aerodynamic conditions that might otherwise arise. Because of the convergent shape, airflow along the outer flaps and seals are prone to separation which causes a highly undesirable increase in boat-tail drag on the nozzle, engine and ultimately the aircraft. Therefore, it is highly desirable to forestall separation as far aft on the outer flaps as possible and to eliminate separation along the flaps, if possible.

The hot pressurized nozzle flow tends to leak out of the nozzle flow path and into a nozzle bay formed between the convergent and divergent flaps and seals and the outer flaps. This pressurizes the bay which then leaks relatively high pressure airflow between the engine casing and the outer flaps and seals where the outer flaps are pivotally connected to the exhaust casing of the engine by hinges. The leakage from the bay can cause the boundary layer along the outer flaps and seals to trip from laminar to turbulent flow and, in turn, to cause the airflow along the outer flaps and seals to separate, thus, bringing about the unwanted increase in boat-tail drag. The separation can cause other undesirable effects relating to aerodynamic flow instabilities caused by the flow separation. U.S. Pat. No. 4,022,948 discloses resiliently coated metallic finger seals having two overlapping metallic seal members fixed at one set of ends with fingers extending backward at another set of ends encapsulated with resilient coating material. The slits between the fingers are offset between fingers so that resilient coating material cannot extend continuously between coatings over the upper and lower fingers. The resilient coating extends almost to the end of the slits but doesn't form an elastic seal entirely around the fingers. The problem of leakage is compounded by the strong aerodynamic forces acting along the interface between the engine casing and the outer flaps and seals and because the outer flaps and seals are pivoted with respect the engine casing.

The present invention overcomes these problems by providing an elastic seal which functions like a rubber band to keep the elastic seal tightly but resiliently against sealed elements. The elastic seal has at least one embodiment that can be used between the engine casing and the outer flaps and seals and which can be used for axisymmetric vectoring and non-vectoring nozzles and for two dimensional vectoring and non-vectoring nozzles. These features and advantages will become more readily apparent in the following description when taken in conjunction with the appended drawings.

SUMMARY OF THE INVENTION

The present invention provides an elastic seal which includes a longitudinally extending elastomeric seal member with a continuous sealing surface and a longitudinally extending structural support member having at least one section with fingers extending transversely from the section with slots between the fingers. Each of the fingers are entirely embedded within the elastomeric seal member near the continuous sealing surface. The fingers are preferably articulated downward in a direction normal to the sealing surface and together with the rest of the support member are preferably made of a flexible material such as a springy sheet metal.

In one particular embodiment of the invention, the elastomeric seal member is an elastomeric band and the structural member includes a preferably continuous metallic band with the fingers extending transversely from the metallic band. The continuous metallic and elastomeric bands may be annular, rectangular, ellipsoid, or have some other shaped cross-section. Another embodiment particularly useful for rectangular seals and for two dimensional (2D) nozzles, provides peripherally extending portions of the inner metallic member around corners of the seal having no fingers. Yet, another embodiment particularly useful for seals and nozzles having angled or rounded corners, such as ellipsoidal, provides peripherally extending portions of the inner metallic member around corners of the seal with no slots. The support member may be segmented having at least two metallic segments (more than two may also be useful) of a metallic segmented band.

The present invention also provides a seal assembly having a relatively fixed first periphery around a first component, a second periphery around a second component disposed in relatively movable relationship with respect to the first component, a gap between the components, a seal, as disclosed above, disposed across the gap in sealing engagement with sealed surfaces of the components. The seal assembly may include a rotatable relationship between one of the sealed surfaces against the continuous inner sealing surface of the continuous elastomeric band of the seal.

One more particular embodiment includes an annular ring connected in force transmitting relationship to a gas turbine engine nozzle casing annularly disposed about a nozzle axis such that the first periphery is circumscribed around the annular ring, and the second periphery is circumscribed around outer nozzle elements. The outer nozzle elements are circumferentially disposed about the nozzle axis and are either outer flaps pivotally connected to the ring or outer flaps pivotally connected to the ring with outer seals interdigitated between the outer flaps and the second periphery and the metallic and elastomeric bands are annular. The annular ring may be fixedly connected to the gas turbine engine nozzle casing with the first periphery circumscribed around a nozzle fairing attached to the annular ring. The annular ring may be movable with respect to the gas turbine engine nozzle casing with the first periphery circumscribed around a nozzle fairing attached to the annular ring. The annular ring may be translatable with respect to the gas turbine engine nozzle casing and/or tiltable with respect to the gas turbine engine nozzle casing. The outer nozzle elements may each have an end that is curved at a radius of curvature which extends from the outer flaps to an axis of rotation about which the outer flaps are pivotally connected to the ring.

ADVANTAGES

The present invention has many advantages over seals disclosed in the prior art. The present invention provides a more complete seal and seal assembly that can better seal all around a periphery, particularly between relatively movable gas turbine engine nozzle components such as between rings attached to a nozzle casing and outer flaps or outer flaps and seals. The seal can better seal gaps between vectored axisymmetric nozzle outer flaps and rings they are attached to in both vectored and unvectored attitudes. This provides better control of airflow over the outer elements on the outside of the nozzle. Another advantage is that seals of the present invention can be constructed to accommodate symmetric as well as non-symmetric, fixed shapes and somewhat variable shapes, and rounded, linear and squared shapes of components to be sealed. The present invention can be used in new designs and retrofits and is relatively inexpensive to construct.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

FIG. 1 is a cross-sectional illustration of an axisymmetric non-vectoring gas turbine engine variable nozzle having an outer flap elastic seal in accordance with the present invention;

FIG. 2 is an enlarged view of the elastic seal in FIG. 1;

in FIG. 1;

FIG. 7 is a cross-sectional illustration of an 2D gas turbine engine nozzle having an outer flap seal and seal assembly in accordance with a fourth embodiment of the present invention;

FIG. 7A is a cross-sectional illustration of the elastic seal taken through 7A—7A in FIG. 7;

DETAILED DESCRIPTION

Figures 1, 2:
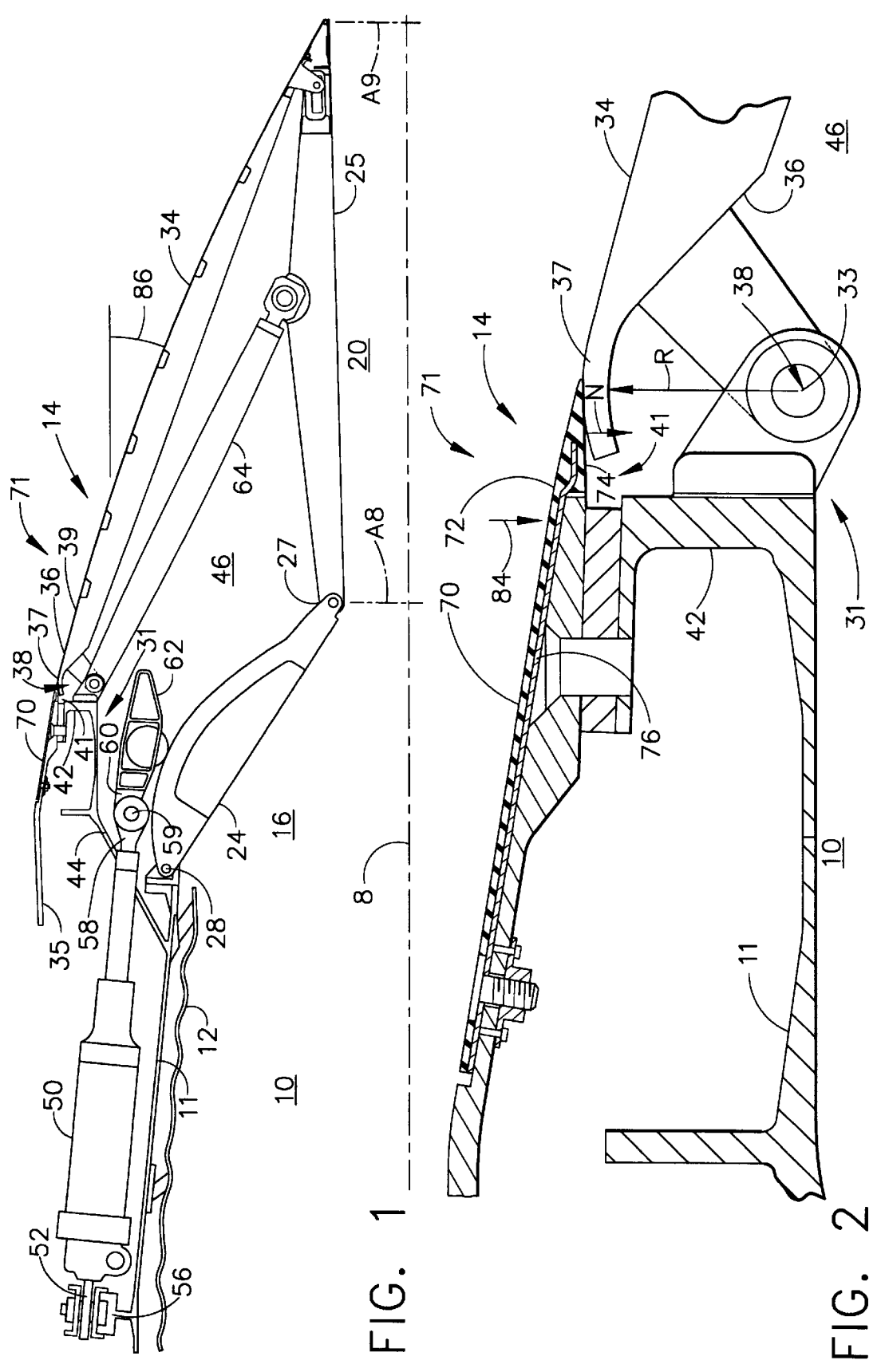
Figure 3:
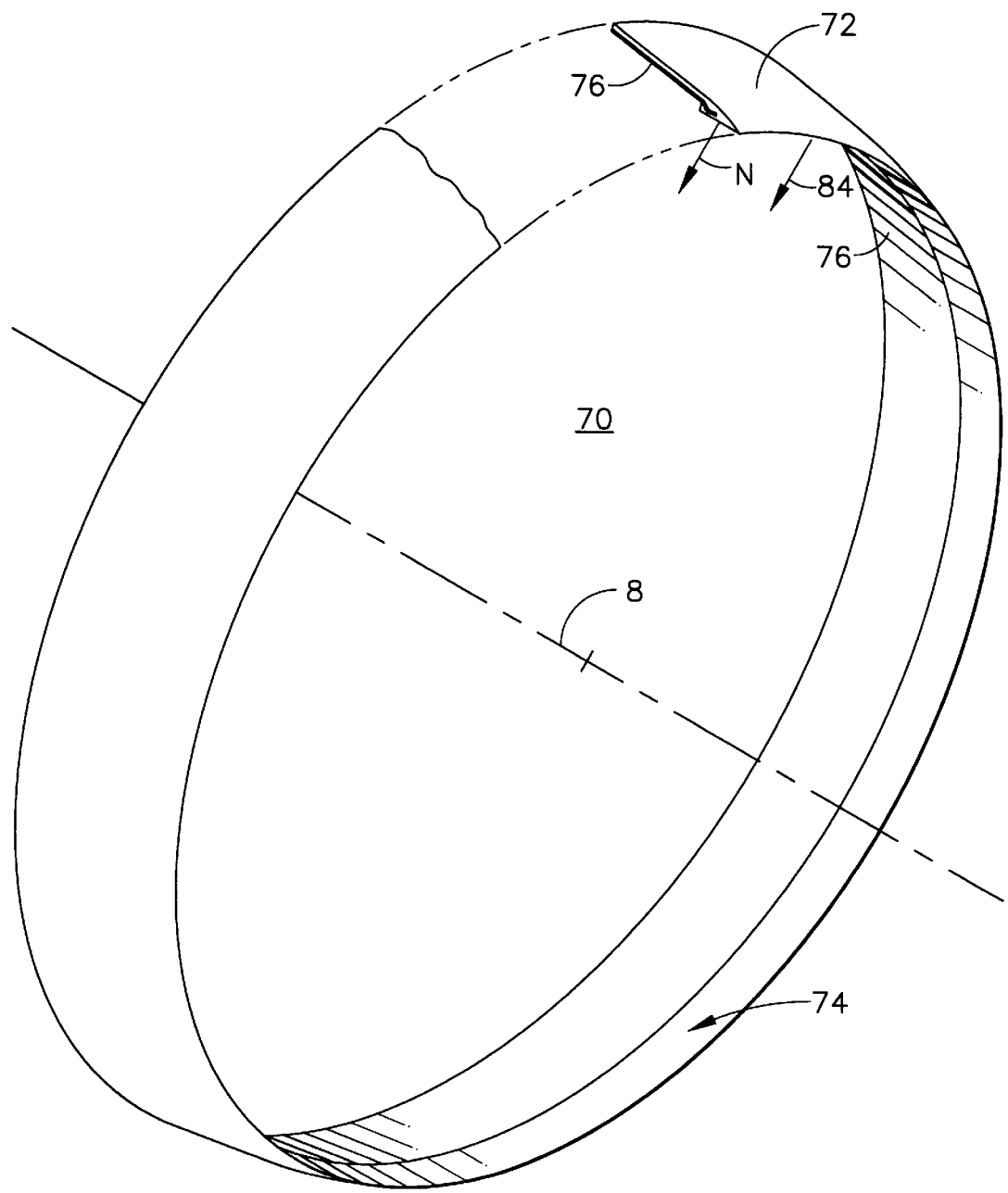
FIG. 3 is a perspective view of the outer flap elastic seal.

Referring now to the drawing, there is schematically illustrated in FIG. 1 an exhaust section 10 of a gas turbine engine includes, in serial flow relationship, a fixed area duct or more particularly an engine casing 11, including an afterburner liner 12, and a convergent/divergent symmetric variable area exhaust nozzle 14 of the type commonly found in military gas turbine engines such as the General Electric F110 engine used in the F-16 aircraft. Nozzle 14 as shown is of the convergent/divergent type, though the present invention is not intended to be limited to such a structure, and includes in serial flow relationship a convergent section 16, a throat 18 and a divergent section 20. The convergent section 16 includes a plurality of convergent flaps 24 circumferentially disposed about an engine centerline 8 and overlapping convergent seals (not shown) disposed between and in sealing engagement with radially inward facing surfaces of circumferentially adjacent ones of the convergent flaps 24. The convergent flaps 24 are pivotally attached at their forward ends to casing 11 by first pivotal or clevis joints 28. Similarly, the divergent section 20 includes a plurality of divergent flaps 25 circumferentially disposed about the engine centerline 8 and overlapping divergent seals (not shown) are disposed between and in sealing engagement with radially inward facing surfaces of circumferentially adjacent ones of the divergent flaps 25. The convergent flaps 24 are pivotally attached at their forward ends to casing 11 by first pivotal or clevis joints 28. The convergent and divergent flaps 24 and 25, respectively, are pivotally attached to each other at their adjacent ends 27 at the throat 18 of the nozzle 14.

The variable area exhaust nozzle 14 includes at an outer periphery 31 a plurality of circumferentially spaced outer flaps 34 having their forward end 36 hinged on a circumferentially extending common circle 38 about engine centerline 8 in such a way as to collectively define a continuous downstream converging frustum of a cone when the nozzle is in the closed position. The outer flaps 34 overlap each other in an iris type arrangement to provide a continuous frustum of a cone in an open as well as closed position.

Some exhaust nozzles such as that disclosed in U.S. Pat. No. 4,128,208, entitled "Exhaust Nozzle Flap Seal Arrangement", have non-overlapping outer flaps which form a discontinuous frustum of a cone when in the open position, the discontinuity being pie-shaped in form. In order to offset the aerodynamic effect of these discontinuities, a plurality of outer seals (not shown) are placed in close relationship with the inner sides of the outer flaps 34, with an outer seal being placed between each pair of outer flaps so as to effectively seal off the discontinuities whenever the nozzle is not in the fully closed position.

The outer flaps 34 or the combination of outer flaps and the outer seals define part of an outer flow path 39 of the nozzle 14. The outer flow path 39 has a frusto-conical shape often called a boattail which is subject to separation and all of the adverse effects associated to separation discussed above. The common circle 38 defines an annular gap 41 or interval around the nozzle 14 along where the forward ends 36 of the outer flaps are hinged to an annular ring 42 that is fixedly attached to the engine casing 11 in force transmitting relationship by a conical web 44. The annular ring 42 may be part of a nozzle fairing 35 as illustrated in FIGS. 1 and 2. Annularly disposed between the outer flaps 34 and the convergent section 16, throat 18 and divergent section 20 is a nozzle bay 46 which contains pressurized air that can leak through the gap 41 and cause airflow into and normal to the outer flow path 39 which can precipitate separation at or directly downstream of the gap.

Variations of a nozzle throat area A8 and/or a nozzle exit area A9 are generally controlled by either a crew command or automatically by an electronic controller in accordance with engine performance requirements and are generally accomplished by hydraulic means illustrated by a plurality of hydraulic nozzle actuators 50 which are disposed around the engine casing 11 and having a casing end 52 connected by a mounting ring 56 to the casing which tends to fix the radial position of the nozzle actuators. A rod end 58 of the nozzle actuator 50 is connected by a bolt 59 to a clevis 60 which extends from a fixed diameter actuation ring 62. Each of the divergent flaps are connected to the annular ring 42 by way of the secondary drive links 64. The annular gap 41 is sealed all around the nozzle 14 by a elastic seal 70 in accordance with a first embodiment of the present invention. The present invention provides a seal assembly 71 with the elastic seal 70 disposed around the periphery of and in sealing engagement with the engine casing 11 or the nozzle fairing 35 and outer flaps 34. The elastic seal 70 is annular and continuous in this embodiment as illustrated in FIG. 3 but may, for particular applications, be segmented into annular segments which when assembled form an annular elastic seal 70.

Figure 4:
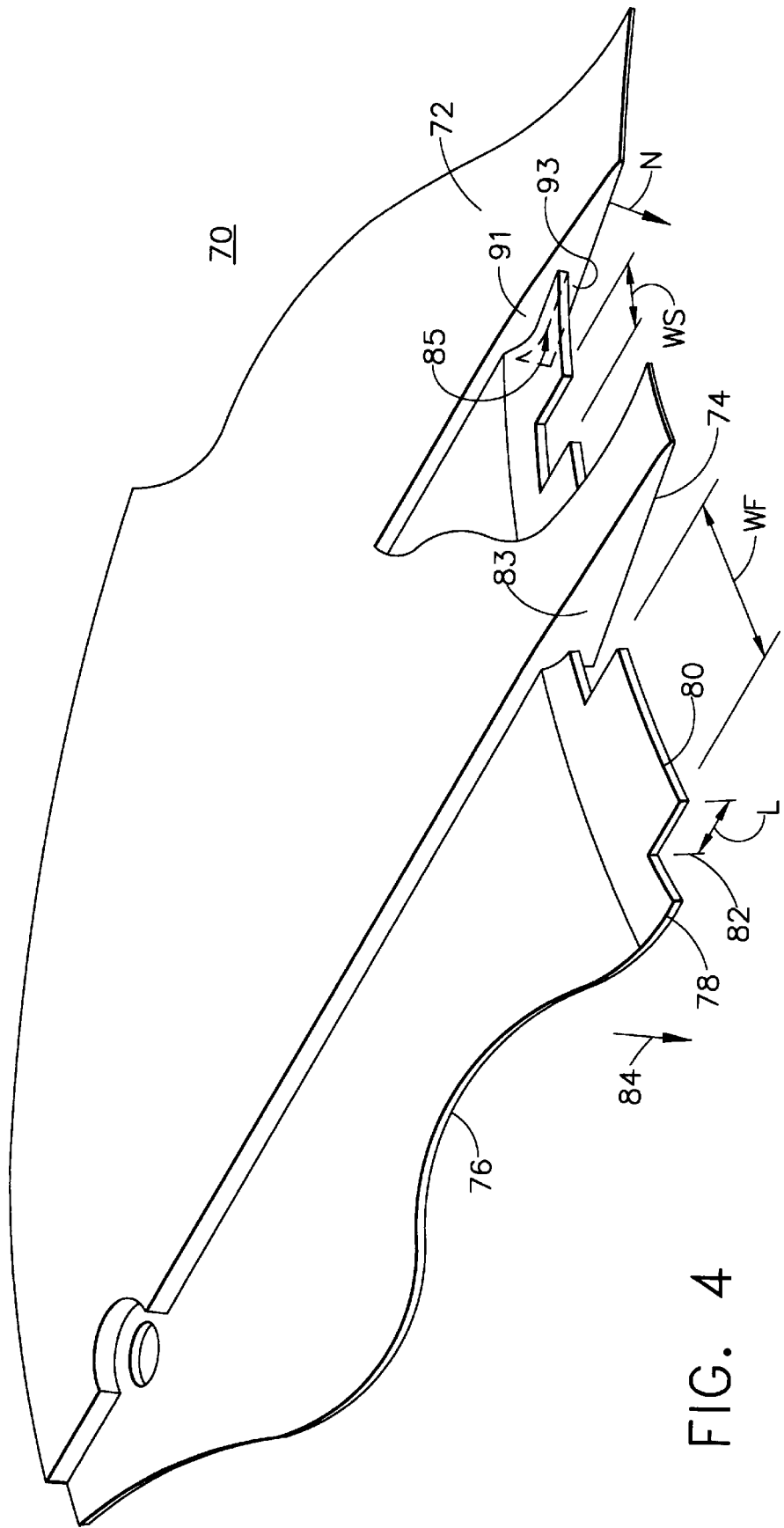
FIG. 4 is a partially cut-away diagrammatic top view of the elastic seal in accordance with the present invention such as the outer flap elastic seal in FIG. 1.

Referring to FIGS. 2–4, the annular gap 41 is sealed all around the nozzle 14 by the elastic seal 70 of the present invention which includes a longitudinally extending elastomeric seal member 72 with a continuous sealing surface 74 and a preferably metallic longitudinally extending structural support member 76 having at least one longitudinally extending section 78 with fingers 80 extending transversely from the section and slots 82 between the fingers. Each of the fingers 80 is entirely embedded within and covered entirely by the elastomeric seal member 72 near the continuous sealing surface 74. The fingers 80 are preferably articulated downward 84 in a direction N normal to the sealing surface 74 and, preferably, together with the rest of the support member are preferably made of a flexible material such as a springy sheet metal. The articulated fingers 80 further urge the sealing surface 74 into contact and better sealing engagement with the outer flaps 34. The elastomeric seal member 72 may be made of fluoroelastic material such as a Viton™ elastomer, a trademarked artificial or man made rubber material made by the DuPont company and a wear and/or lubricating coating is also preferably used over at least the elastomeric sealing surface 74.

Referring again to FIG. 2, each of the outer flaps 34 preferably have a curved end 37 that is curved at a radius of curvature R which extends from the outer flaps to an axis of rotation 33 about which the outer flaps are pivotally connected to the ring 42. This enhances sealing between the continuous sealing surface 74 and the curved ends 37 of the outer flaps 34 or any rotatable or pivotal element that the elastic seal of the present invention may be used with. The fingers 80 and slots 82 in between allow for localized sealing which is particularly useful when the boat-tail angles 86, generally the acute angles between the outer flaps 34 tangency and the nozzle or engine centerline 8, change during the adjustment of A8/A9 or when the throat area A8 is varied. This is also true of 2D nozzles 14A such as the one illustrated in FIGS. 7 and 7A. The articulation of the fingers 80 better help the fingers act as springs to urge the sealing surface 74 into contact and better sealing engagement with the outer flaps 34.

The elastic seal 70, illustrated in greater detail in FIG. 4, has each of the fingers 80 entirely embedded within the elastomeric seal member 72 such that the elastomeric material of the elastomeric seal member fills the slots 82 between the fingers, thus, forming structural walls 83 that structurally connect upper and lower longitudinally extending elastomeric band portions 91 and 93, respectively, of the elastomeric seal member. This also forms a compartment 85 around the fingers 80 which allows the fingers to locally direct the sealing and to locally accommodate surface irregularities of the surface being sealed. This provides an integrated band that allows the elastomeric seal member 72 to provide the sealing function and the support member 76 help urge the sealing surface 74 into sealing engagement so that the elastic seal 70 operates similar to a rubber band. The elastic seal 70 is preferably undersized so that the elastomeric member 72 must be stretched over the outer flaps 34 providing a tight uniform seal.

Figure 5:
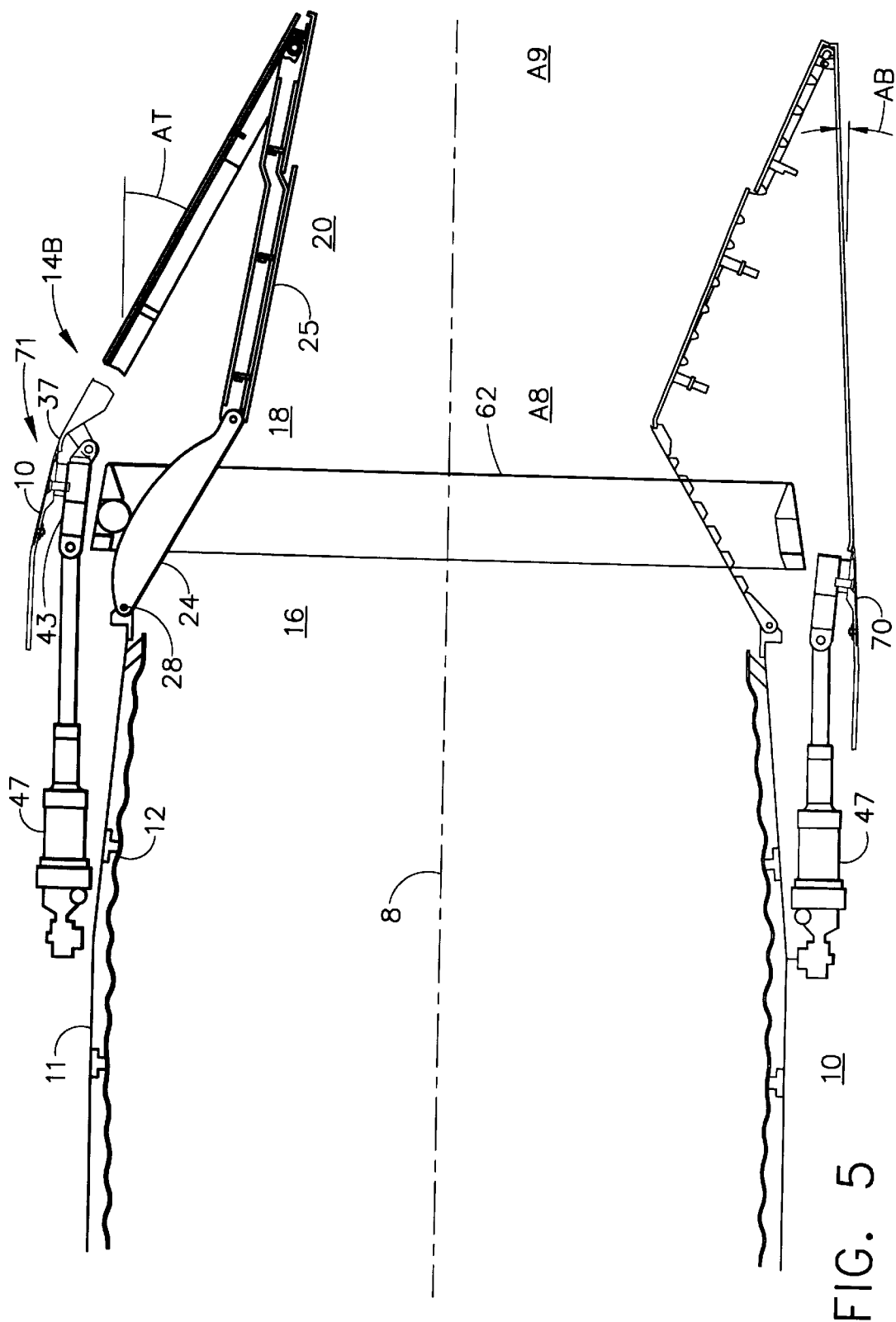
FIG. 5 is a cross-sectional illustration of an axisymmetric vectoring gas turbine engine variable nozzle having an outer flap elastic seal and seal assembly in accordance with a second embodiment of the present invention.

The fingers 80 and slots 82 may be designed to accommodate different types of design goals and geometries. Finger widths WF and slot widths WS and finger and slot lengths L may be designed to promote better localized sealing. Longer more narrow fingers will accommodate a greater amount of out of plane variance such as that encountered by outer flaps 34 and outer seals of axisymmetric vectoring nozzles 14B such as those disclosed in U.S. Pat. Nos. 4,994,660 and 5,485,959, and as illustrated in FIG. 5. Note that when the nozzle is in the vectored position as shown in FIG. 5 a top boat-tail angle AT is greater than a bottom boat-tail angle AB and the seal accommodates the circumferential variation as well as the out of plane (that normal to the plane of FIG. 5) variation. The fingers 80 are preferably articulated downward in a direction N normal to the sealing surface 74 so as to help direct the elastomeric force produced by the elastomeric seal member 72 in a desired direction to better promote sealing engagement with the outer flaps 34, or whatever element and surface the elastic seal 70 is sealing. The elastomeric seal member 72 provides the primary sealing force and the fingers 80 help provide sealing force and also provide stability and accommodation of surface irregularities. The outer flaps 34 are hinged to an annular vectoring ring 43 which is actuated and attached to the engine casing 11 in force transmitting relationship by vectoring actuators 47. The annular vectoring ring 43 is translatable with respect to the gas turbine engine nozzle casing 11 and tiltable with respect to the gas turbine engine nozzle casing and about the engine centerline 8. The outer nozzle elements, the outer flaps 34 and outer seals, each preferably have one of the curved ends 37 that is curved at the radius of curvature R which extends from the outer flaps to the axis of rotation 33 about which the outer flaps are pivotally connected to the vectoring ring 43.

Figure 10:
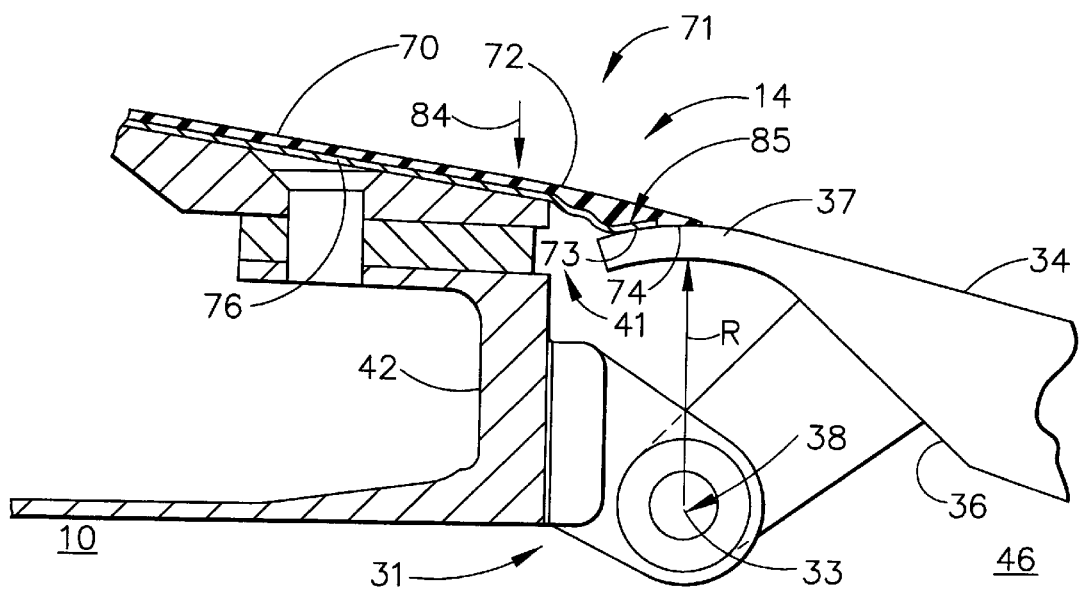
FIG. 10 is an enlarged view of an alternate elastic seal which can be used for the nozzle in FIG. 1.

FIG. 10 illustrates a variation or alternate embodiment of elastic seal 70 in which the metallic fingers are not covered on their metallic bottom surface 73 by the elastomeric seal member 72 the continuous sealing surface 74 and part of the bottom surface 73 of the metallic fingers contact and seal the outer flaps 34. The elastic seal 70 illustrated herein still retains the benefits afforded by the walls 83 which structurally connects the upper and lower longitudinally extending elastomeric band portions 91 and 93, respectively, though, the fingers 80 are not entirely embedded within the elastomeric seal member 72. The elastomeric material of the elastomeric seal member 72 fills the slots 82 between the fingers, thus, allowing the walls 83 to connect an area of the elastomeric seal member 72 containing the sealing surface 74 to be structurally tied to the upper band portion 93 and to form the compartment 85 around the fingers 80. This variation may be used in many of the applications disclosed in this patent as well as others contemplated by this patent.

Figure 6:
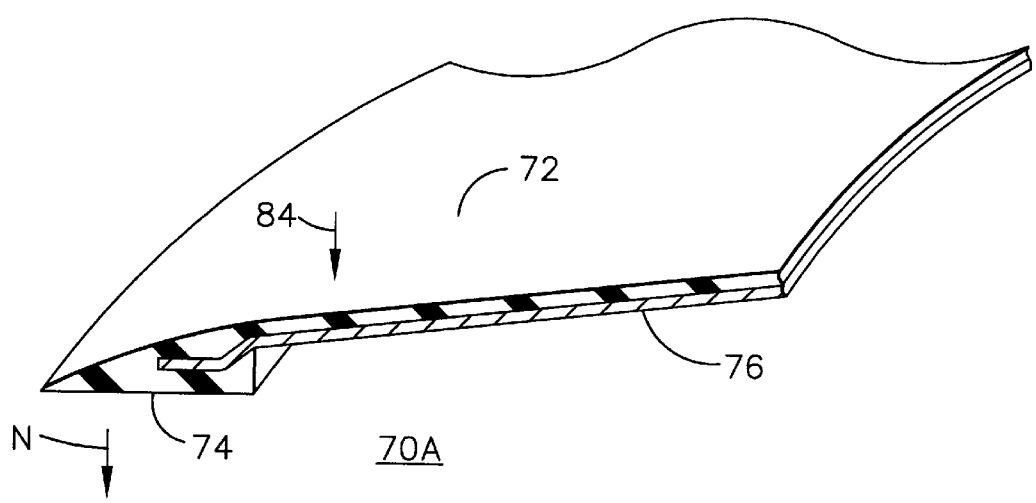
FIG. 6 is a partially cut-away diagrammatic top view a linear elastic seal in accordance with a third embodiment of the present invention.

FIG. 6 illustrates a linear elastic seal 70A, in accordance with a third embodiment of the present invention, which includes a longitudinally extending linear elastomeric seal member 72 with a continuous sealing surface 74 and a preferably metallic longitudinally extending linear structural support member 76 having at least one longitudinally extending section 78 with fingers 80 extending transversely from the section and slots 82 between the fingers. Each of the fingers 80 is entirely embedded within the elastomeric seal member 72 near the continuous sealing surface 74.

The elastic seal 70 is preferably a continuous band with the elastomeric seal member 72 and the inner structural support member 76 being continuous bands that may be annular, rectangular, square, or otherwise shaped. FIGS. 7 and 7A illustrate a 2D nozzle having a rectangular or more particularly a continuous band square shaped elastic seal 70B with continuous band square shaped elastomeric seal member and inner structural support members 72 and 76, respectively. Peripherally extending portions 90 of the inner structural support member 76 around squared corners 92 of the square shaped elastic seal 70B preferably have no fingers 80 to better accommodate the 2D pivoting of the outer flaps 34.

Figure 8:
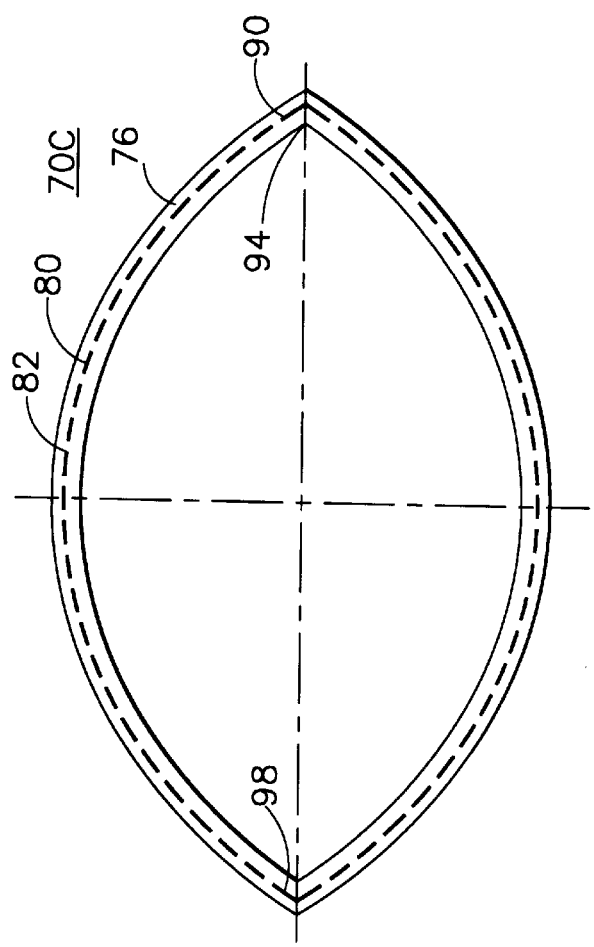
FIG. 8 is a cross-sectional illustration of an non-axisymmetric ellipsoid shaped gas turbine engine nozzle having an outer flap elastic seal and seal assembly in accordance with a fifth embodiment of the present invention.

FIG. 8 illustrates an ellipsoidally shaped elastic seal 70C particularly useful for elastic seals and nozzles having angled or rounded corners 94. The ellipsoidally shaped elastic seal 70C provides peripherally extending portions 90 of the inner structural support member 76 around the angled or rounded corners 94 of the ellipsoidally shaped elastic seal 70C with no slots 82. Instead the angled or rounded corners 94 of the ellipsoidally shaped elastic seal 70C have bent fingers 98 that are bent around the corners of the ellipsoidally shaped elastic seal.

Figure 9:
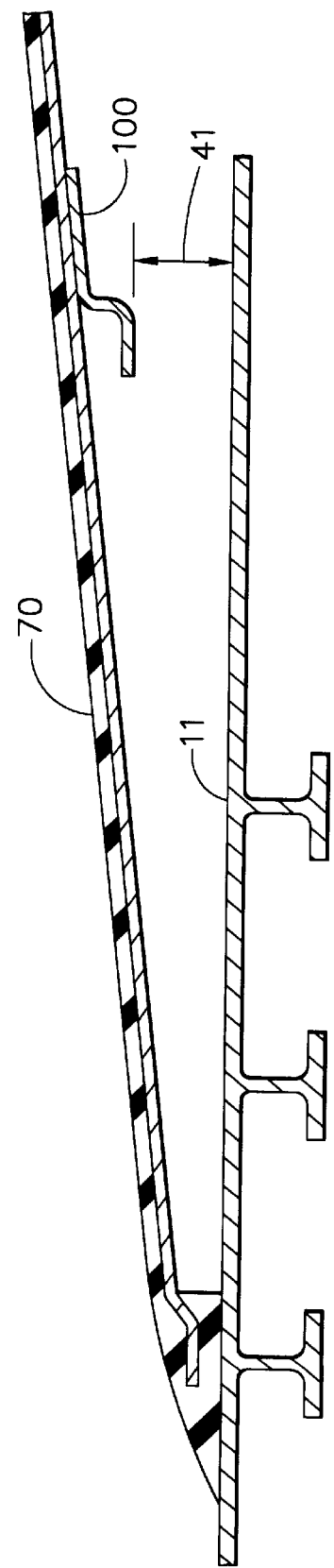
FIG. 9 is a cross-sectional illustration of an aircraft to engine outer elastic seal and assembly in accordance with a sixth embodiment of the present invention.

FIG. 9 illustrates the use of the seal 70 and the seal assembly 71 of the present invention for sealing the gap 41 between the engine casing 11 and an aircraft structure such as a skin 100.

The foregoing descriptive embodiments of the invention have been presented for the purpose of describing and illustrating the invention. It is not intended to be exhaustive or to limit the invention to the precise form disclosed and obviously many modifications and variations are possible in light of the above teachings. While the preferred embodiment of the invention has been described fully in order to explain its principles, it is understood that various modifications or alterations may be made to the preferred embodiment without departing from the scope of the invention as set forth in the appended claims.

What is claimed is:

1. An elastic seal comprising:
    a longitudinally extending elastomeric seal member,
    said elastomeric seal member having a continuous sealing surface,
    a longitudinally extending structural support member having at least one section with a plurality of fingers extending transversely from said section and slots between said fingers, and
    each of said fingers entirely embedded within and covered entirely by said elastomeric seal member near said continuous sealing surface.

2. An elastic seal as claimed in claim 1 wherein said fingers are articulated downward in a direction normal to said sealing surface.

3. An elastic seal as claimed in claim 1 wherein said elastomeric seal member is a peripherally extending elastomeric band.

4. An elastic seal as claimed in claim 3 wherein said support member comprises a continuous metallic band.

5. An elastic seal as claimed in claim 4 wherein said continuous metallic and elastomeric bands are annular.

6. An elastic seal as claimed in claim 4 wherein said fingers are articulated downward in a direction normal to said sealing surface.

7. An elastic seal as claimed in claim 4 wherein peripherally extending portions of said metallic band around corners of said seal have peripherally continuous slots extending around said corners.

8. An elastic seal as claimed in claim 4 wherein peripherally extending portions of said metallic band around corners of said seal have peripherally continuous fingers extending around said corners.

9. An elastic seal as claimed in claim 3 wherein said support member is segmented and comprises at least two metallic segments of a metallic segmented band.

10. A seal assembly comprising:
    a relatively fixed first periphery around a first component,
    a second periphery around a second component disposed in relatively movable relationship with respect to said first component,
    a gap between said components,
    an elastic seal disposed across said gap in sealing engagement with sealed surfaces of said components,
    said seal comprising;
    a longitudinally extending elastomeric seal member,
    said elastomeric seal member having a continuous sealing surface,
    a longitudinally extending structural support member having at least one section with a plurality of fingers extending transversely from said section and slots between said fingers, and
    each of said fingers covered entirely by said elastomeric seal member near said continuous sealing surface.

11. A seal assembly as claimed in claim 10 wherein said movable relationship includes a rotatable relationship between one of said sealed surfaces against said continuous sealing surface.

12. A seal assembly as claimed in claim 11 wherein said support member comprises a continuous metallic band.

13. A seal assembly as claimed in claim 12 wherein said continuous metallic and elastomeric bands are annular.

14. A seal assembly as claimed in claim 13 further comprising:
- an annular ring connected in force transmitting relationship to a gas turbine engine nozzle casing annularly disposed about a nozzle axis,
- said first periphery circumscribed around said annular ring,
- said second periphery circumscribed around outer nozzle elements circumferentially disposed about said nozzle axis,
- said outer nozzle elements comprising at least one type of said outer nozzle elements chosen from a group of types consisting of outer flaps pivotally connected to said ring and said outer flaps pivotally connected to said ring interdigitated with outer seals, and
- said second periphery circumscribed about outer nozzle element surfaces of said outer nozzle elements.

15. A seal assembly as claimed in claim 14 wherein said annular ring is fixedly connected to said gas turbine engine nozzle casing and said first periphery is circumscribed around a nozzle fairing attached to said annular ring.

16. A seal assembly as claimed in claim 14 wherein said annular ring is movable with respect to said gas turbine engine nozzle casing and said first periphery is circumscribed around a nozzle fairing attached to said annular ring.

17. A seal assembly as claimed in claim 16 wherein said annular ring is translatable with respect to said gas turbine engine nozzle casing.

18. A seal assembly as claimed in claim 17 wherein said annular ring is also tiltable with respect to said gas turbine engine nozzle casing.

19. A seal assembly as claimed in claim 14 wherein each of said outer nozzle elements include an end that is curved at a radius of curvature which extends from said outer flaps to an axis of rotation about which said outer flaps are pivotally connected to said ring.

20. A seal assembly as claimed in claim 12 wherein said continuous metallic and elastomeric bands are rectangular and peripherally extending portions of said metallic band around corners of said seal have peripherally continuous slots extending around said corners.

21. A seal assembly as claimed in claim 20 wherein said peripherally extending portions of said metallic band around corners of said seal have peripherally continuous fingers extending around said corners.

22. A seal assembly as claimed in claim 14 wherein said fingers are articulated downward in a direction normal to said sealing surface.

23. A seal assembly comprising:
- a relatively fixed first periphery around a first component,
- a second periphery around a second component disposed,
- a gap between said components,
- an elastic seal disposed across said gap in sealing engagement with sealed surfaces of said components,
- said seal comprising;
- a longitudinally extending elastomeric seal member,
- said elastomeric seal member having a continuous sealing surface,
- a longitudinally extending structural support member having at least one section with a plurality of fingers extending transversely from said section and slots between said fingers, and
- each of said fingers entirely embedded within and covered entirely by said elastomeric seal member near said continuous sealing surface.

24. A seal assembly as claimed in claim 23 wherein said first component is an aircraft structure and said second component is a gas turbine engine nozzle casing.

* * * * *